No. 612,791. Patented Oct. 18, 1898.
H. TEN WINKEL.
OIL EXTRACTOR.
(Application filed Feb. 19, 1898.)

(No Model.)

UNITED STATES PATENT OFFICE.

HERMAN TEN WINKEL, OF DENVER, COLORADO, ASSIGNOR OF ONE-HALF TO DAVID LINN, OF GROSSE ISLE, MICHIGAN.

OIL-EXTRACTOR.

SPECIFICATION forming part of Letters Patent No. 612,791, dated October 18, 1898.

Application filed February 19, 1898. Serial No. 670,960. (No model.)

*To all whom it may concern:*

Be it known that I, HERMAN TEN WINKEL, a citizen of the United States of America, residing at Denver, in the county of Arapahoe and State of Colorado, have invented certain new and useful Improvements in Oil-Extractors; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in oil-extractors, being specially designed for the separation of oil from water. It is well known that water of condensation resulting from exhaust-steam contains a considerable quantity of oil, as well as other foreign particles of matter or impurities.

The object of my invention is to extract the oil and remove the other impurities from water, and while I have referred to water of condensation resulting from exhaust-steam which has come in contact with lubricated parts of machinery and collected oil and other impurities therefrom it is evident that my invention may be employed to equal advantage in removing the same impurities regardless of the water in which the said impurities are collected; and to these ends the invention consists of the features, arrangements, and combinations hereinafter described and claimed, all of which will be fully understood by reference to the accompanying drawings, in which is illustrated an embodiment thereof.

Figure 1:
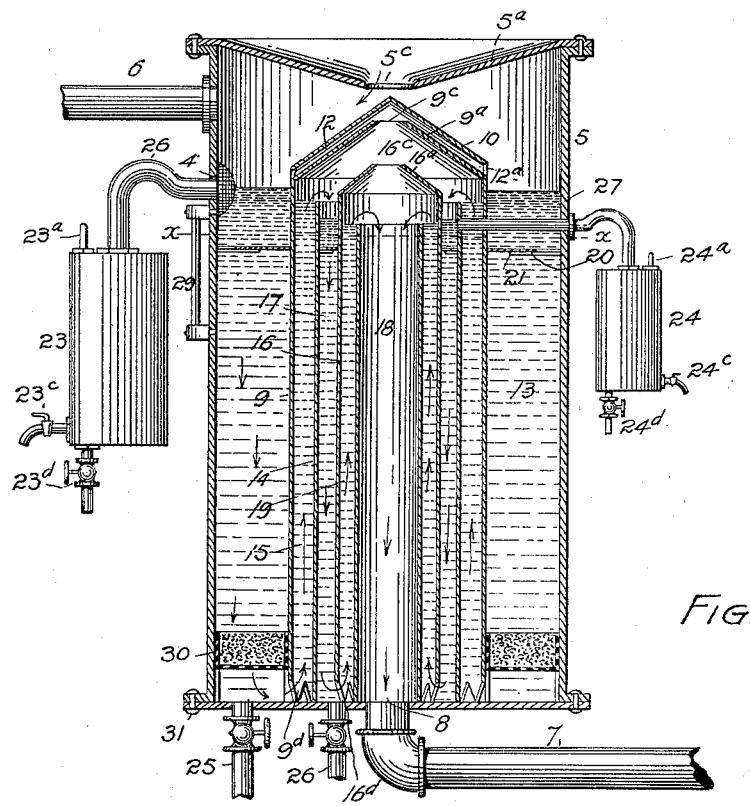
Figure 2:
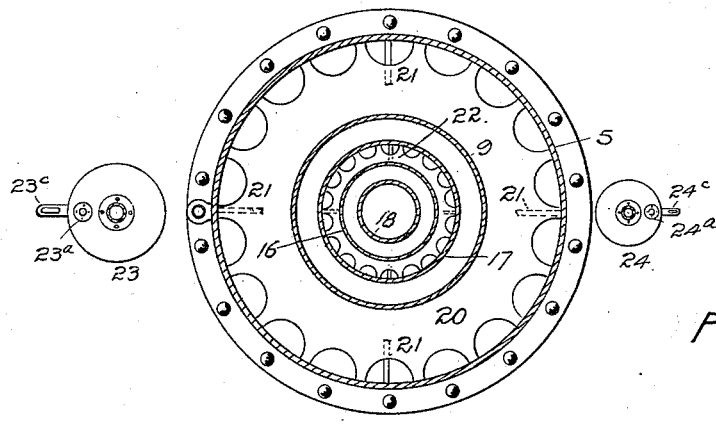

In the drawings, Figure 1 is a vertical longitudinal section taken through my improved apparatus. Fig. 2 is a horizontal section taken on the line $x$ $x$, Fig. 1, looking downward.

Similar reference characters indicating corresponding parts in these views, let the numeral 5 designate a suitable tank or reservoir having an inlet at the top for the water to be treated and a central opening in the bottom for its escape after purification. The top head $5^a$ of the tank is funnel-shaped and provided with a central inlet-opening $5^c$. The water may also enter the reservoir by way of a conduit 6, connected with the upper extremity thereof and leading from any suitable supply source. A conduit 7 leads from the bottom or escape opening 8 of the tank. Within the reservoir 5 and at a suitable distance from its vertical wall is placed a concentric partition 9, having a conical frustum-shaped top $9^a$, in which is formed an opening $9^c$. Mounted on the partition 9, above the top $9^a$, is a conical or dome-shaped shield 10, which is closed at the top and supported by short legs $12^a$, which separate the top $9^a$ from the shield or dome 10, leaving an intermediate air-space 12, communicating with the compartment 13 between the wall of the reservoir and the partition 9. The partition 9 is provided with saw-tooth openings $9^d$ around its bottom. Within the space inclosed by the partition 9 is located another partition 14, forming a compartment 15. This partition 14 is open at the top and closed at the bottom. Within the space inclosed by the partition 14 is located another partition 16, forming a compartment 17 between the partitions 14 and 16. This partition 16 projects a short distance above the partition 14 and is provided with a conical frustum-shaped top $16^a$, having an opening $16^c$. The bottom of the partition 16 is provided with openings $16^d$. Within the space inclosed by partition 16 is located a central tube 18, between which and the partition 16 is formed a compartment 19. The tube 18 is open at the top, and its bottom surrounds the escape-opening 8 of the reservoir. In the upper portion of the compartment 13 is located a removable apertured diaphragm 20, resting upon suitable lugs 21, attached to the wall of the reservoir and the partition 9. A similar removable apertured diaphragm 22 is located between the partitions 14 and 16 and near the upper extremity of the inclosed compartment 17. The function of these partitions is to break the force of the water falling into the compartments 13 and 17, and thereby prevent agitation, thus facilitating the separation of the oil from the water, the oil rising to the top and passing to the receptacles 23 and 24 by way of conduits 26 and 27, leading from the compartments 13 and 17, respectively. These receptacles are provided with vents $23^a$ and $24^a$, draw-off faucets $23^c$ and $24^c$, and valved outlets $23^d$ and $24^d$ for flushing purposes. The main reservoir is also provided with valve-controlled outlets 35 and 36, communicating with the various compartments for the purpose of flushing said reservoir or removing the sedimentary deposits or settlings which may accumulate in the bottom of the tank. The main tank or reservoir is also provided with a water glass tube or gage 29, communicating with the chamber or compartment 13 and so located that it indicates the depth of the water, as well as the amount of oil, if any, below the oil-outlet conduits 26 and 27.

The operation of the apparatus is as follows: The water enters the reservoir 5 by way of the opening $5^c$ or the conduit 6, either or both, as may be desired. In the one case it falls upon the dome-shaped top or shield 10 and falls therefrom into the chamber 13, while in the other case it falls directly into the said chamber from the conduit 6. It first falls upon the diaphragm 20, which breaks the force of the falling water and prevents agitation below the diaphragm, through which the water passes by way of apertures formed, preferably, in its outer edges. Near the bottom of the compartment 13 is placed a filter 30, supported upon legs 31. The walls of this filter are perforated or composed of wire-screen adapted to hold gravel or other suitable filtering material. The filter is designed to remove the impurities other than oil that the water may contain. After leaving the filter the water passes through the apertures $9^d$ and thence up through the conduit 15, over the top of the partition 14, through the compartment 17, through the apertures $16^d$, thence up through the compartment 19 into the central tube 18, and out of the apparatus through the conduits 7, as indicated by the arrows. All of the compartments formed within the tank having openings at the top communicating with the outer air, the contents of the tank are prevented from siphoning out through the discharge-conduit. This feature also allows the steam to escape by the same passage.

The outlet by way of the conduit 26 is preferably protected inside the chamber 13 by a shield 4, composed of wire-screen, to prevent any dirt that may have a tendency to float with the oil from passing out with the same.

Having thus described my invention, what I claim is—

1. In an oil-extractor, the combination of an upright tank or reservoir having a central discharge-opening in its bottom, and an inlet at the top, a tube attached to the bottom of the tank around said discharge-opening and projecting upward into the tank, and a number of partitions or tubes of larger size surrounding said central tube and dividing the space between it and the wall of the tank into a number of distinct compartments, every alternate tube or partition beginning with the outermost having openings at the bottom, the upper extremity of the outer tube of each compartment extending above the top of the adjacent inner tube whereby every alternate compartment has an inlet at the bottom and an overflow at the top.

2. The combination of an upright tank or reservoir having a central discharge-opening in its bottom and an outlet at the top, a tube attached to the bottom of the tank around said discharge-opening and projecting upward into the tank, and a plurality of partitions or tubes of larger size surrounding said central tube and forming the space between it and the wall of the tank into distinct compartments, every alternate tube or partition beginning with the outermost having openings at the bottom, the upper extremity of the outer tube of each compartment extending above the top of the adjacent inner tube, whereby every alternate compartment has an inlet at the bottom and an overflow at the top, the oil being allowed to collect in the compartments not having the overflow, and detachable apertured diaphragms located near the top of said oil-collecting compartments to prevent agitation below, and thus facilitate the separation of the oil from the water.

3. In an oil-extractor, the combination of an upright tank or reservoir having a central discharge-opening in its bottom and an inlet at the top, a tube attached to the bottom of the tank around said discharge-opening and projecting upward into the tank, a number of partitions or tubes of larger size surrounding said central tube and forming the space between it and the wall of the tank into a number of distinct compartments, every alternate tube or partition beginning with the outermost having openings at the bottom, the upper extremity of the outer tube of each compartment extending above the top of the adjacent inner tube, the outermost compartment being provided with a filter located near the bottom thereof to remove the impurities other than oil from the water.

4. The combination of an upright tank or reservoir having a central discharge-opening in its bottom and an inlet at the top, a tube attached to the bottom of the tank around said discharge-opening and projecting upward into the tank, a number of partitions or tubes surrounding said central tube and forming the space between it and the wall of the tank into a number of distinct compartments, every alternate tube or partition beginning with the outermost having openings at the bottom, the upper extremity of the outer tube of each compartment extending above the top of the adjacent inner tube, whereby every alternate compartment has an inlet at the bottom and an overflow at the top, the oil being allowed to collect in the compartment not having the overflow, and an outlet-conduit leading from the top of each oil-compartment whereby the oil may be carried to suitable receptacles located outside the reservoir.

5. In an oil-extractor, the combination of an upright tank or reservoir having a central discharge-opening in its bottom and an inlet at the top, a tube attached to the bottom of the tank around said discharge-opening and projecting upward into the tank, and a number of partitions or tubes surrounding said central tube and forming the space between it and the wall of the tank into a number of distinct compartments, every alternate tube or partition beginning with the outermost having openings at the bottom, the upper extremity of the outer tube of each compartment extending above the top of the adjacent inner tube whereby every alternate compartment has an inlet at the bottom and an overflow at the top, all of the said compartments having openings in the top communicating with the outer air to prevent siphonage.

In testimony whereof I affix my signature in presence of two witnesses.

HERMAN TEN WINKEL.

Witnesses:
G. J. ROLLANDET,
EDITH HIMSWORTH.